US012012216B2

(12) United States Patent
Stretton (10) Patent No.: US 12,012,216 B2
(45) Date of Patent: Jun. 18, 2024

(54) SUPPORT STRUCTURE FOR ATTACHING A GAS TURBINE ENGINE TO AN AIRCRAFT PYLON

(71) Applicant: ROLLS-ROYCE plc, London (GB)

(72) Inventor: Richard G Stretton, Derby (GB)

(73) Assignee: ROLLS-ROYCE PLC, London (GB)

( * ) Notice: Subject to any disclaimer, the term of this patent is extended or adjusted under 35 U.S.C. 154(b) by 13 days.

(21) Appl. No.: 18/061,330

(22) Filed: Dec. 2, 2022

(65) Prior Publication Data
US 2023/0182911 A1 Jun. 15, 2023

(30) Foreign Application Priority Data

Dec. 9, 2021 (GB) .................................. 2117777

(51) Int. Cl.
*B64D 27/40* (2024.01)
*B64D 27/10* (2006.01)
*F02C 7/20* (2006.01)

(52) U.S. Cl.
CPC ............. *B64D 27/40* (2024.01); *B64D 27/10* (2013.01); *B64D 27/406* (2024.01); *F02C 7/20* (2013.01); *F05D 2220/323* (2013.01); *F05D 2240/90* (2013.01)

(58) Field of Classification Search
CPC .. B64D 27/26; B64D 27/10; B64D 2027/268; F02C 7/20; F05D 2240/90
See application file for complete search history.

(56) References Cited

U.S. PATENT DOCUMENTS

| 5,806,792 A | 9/1998 | Brossier et al. | |
| 6,123,293 A * | 9/2000 | Breitbach | B64D 27/18 244/54 |
| 7,350,747 B2 * | 4/2008 | Machado | B64D 27/26 244/54 |
| 10,144,526 B2 * | 12/2018 | Zameroski | G06F 11/3447 |

(Continued)

FOREIGN PATENT DOCUMENTS

FR 3 071 820 A1 4/2019
FR 3079212 A1 9/2019

OTHER PUBLICATIONS

Apr. 21, 2023 extended Search Report issued in European Patent Application No. 22206290.3.

*Primary Examiner* — Gerald L Sung
*Assistant Examiner* — Rene D Ford
(74) *Attorney, Agent, or Firm* — Oliff PLC (57) ABSTRACT

A gas turbine engine includes a support structure for attaching the engine to an aircraft pylon. The support structure includes: an engine-side interface member, a pylon-side interface member interfacing to the engine-side interface member, and a top V-shaped connection formation above the engine core and pair of side V-shaped connection formations on opposite lateral sides of the engine core, each V-shaped connection formation being formed by a pair of connection members meeting at a vertex, the vertex of the top V-shaped connection formation joining to the top of the engine-side interface member, the vertices of the side V-shaped connection formations respectively joining to the bottom ends of the engine-side interface member, and the connection members extending forwardly from their respective vertices to join to front fixation points at the core casing.

20 Claims, 8 Drawing Sheets (56) References Cited

U.S. PATENT DOCUMENTS

| | | |
|---|---|---|
| 10,647,440 B2 * | 5/2020 | Bouchet .................. G01K 1/20 |
| 2013/0074517 A1 | 3/2013 | Suciu et al. |
| 2017/0043878 A1 | 2/2017 | Pautis et al. |
| 2020/0207481 A1 | 7/2020 | Combes et al. |
| 2021/0269167 A1 | 9/2021 | Colmagro et al. |
| 2022/0411084 A1 * | 12/2022 | Pome .................... B64D 27/24 |

* cited by examiner

SUPPORT STRUCTURE FOR ATTACHING A GAS TURBINE ENGINE TO AN AIRCRAFT PYLON

CROSS-REFERENCE TO RELATED APPLICATIONS

This specification claims priority pursuant to 35 U.S.C. 119(a) to UK Patent Application Number 2117777.9, filed on Dec. 9, 2021, the entire contents of which are incorporated herein by reference.

BACKGROUND

Field of the Disclosure

The present invention relates to a support structure for attaching a gas turbine engine to an aircraft pylon.

Description of the Related Art

Support structures for attaching an engine to an aircraft pylon conventionally include a front mount and a rear mount (as shown in for example US 2020/0207481 and FR 3 079 212-A1). These are configured to transfer loads and torques from the engine to the aircraft pylon. It is known that by moving the front mount as far forwards as possible, core casing distortions can be reduced, whereby core tip clearances and the engine performance can be improved. However, moving a conventional front mount attachment forwards, for example, to the base of fan outlet guide vanes (hereinafter FOGVs), results in the pylon being extended forwards and thus requires an extended upper bifurcation in the bypass duct, or a local blister fairing to cover the front mount, both producing an aero-performance penalty which can be particularly severe in an exhaust system with a high bypass ratio and a low pressure ratio. Thus it is desirable to provide an alternative support structure that can avoid such an aero-performance penalty.

Furthermore, moving a conventional front mount forwards (so that it is ahead of a hinged thrust reverser unit for example) can impair access to the engine for performance of installation and removal tasks. Therefore, it is also desirable to provide a support structure with an engine-to-pylon disconnect point rearwards of any fixed fairings which define aerolines of the front part of the core engine, or of any circumferential heat exchange units, for easy disconnection of the engine from the aircraft pylon and improved maintenance access. Fixed fairings may refer to, for example, the engine mounted core fairings which are usually panels affixed on the inner fan duct wall extending downstream of the FOGVs to the interface with the thrust reverser unit (hereinafter TRU) and these can be removed to access any units underneath them. Since the TRU doors can be hinged open for engine core access, it is desirable to have the engine-to-pylon disconnect point aft of the fixed panels for improved access when the TRU doors are opened.

The present invention has been devised in light of the above considerations.

SUMMARY

In a first aspect, the present disclosure provides a gas turbine engine including a support structure for attaching the engine to an aircraft pylon having a front connection face; wherein the engine further includes:
an engine core comprising a turbine, a compressor, and a core shaft connecting the turbine to the compressor, and a core casing surrounding the engine core;
wherein the support structure includes:
an engine-side interface member positioned outwardly of and radially spaced from the core casing, the engine-side interface member extending circumferentially around a top half of the core casing from a bottom end of the engine-side interface member on one side of the core casing to an opposite bottom end on the opposite side of the core casing,
a pylon-side interface member configured to join to the front connection face and interfacing to the engine-side interface member, the pylon-side interface member also extending circumferentially around the top half of the core casing, and
a top V-shaped connection formation positioned above the engine core and pair of side V-shaped connection formations positioned on opposite lateral sides of the engine core, each V-shaped connection formation being formed by a pair of connection members meeting at a vertex, the vertex of the top V-shaped connection formation joining to the top of the engine-side interface member, the vertices of the side V-shaped connection formations respectively joining to the bottom ends of the engine-side interface member, and the connection members extending forwardly from their respective vertices to join to respective front fixation points at the core casing; and
wherein the engine-side interface member and the pylon-side interface member are joined by plural circumferentially spaced connective links configured so as to transfer roll torques loads from the engine to the pylon.

Advantageously, the three V-shaped connection formations can extend forwardly without an extended upper bifurcation or local blister fairings to cover them. This can reduce the impact e.g. on fan bypass duct exhaust aerolines and improve the aerodynamic performance of an aircraft. The V-shaped connection formations can also allow the support structure to be brought forward to a position, e.g. to the base of FOGVs, where they reduce core casing distortions and improve core tip clearances. More particularly, the loads and torques can be reacted at the front fixation points where they are relatively remote from parts of the core casing which define critical tip clearances and can then be transferred by the V-shaped connection formations tangentially to the core casing line. This avoids introducing local radial loads and the associated radial casing distortions at sensitive positions of the casing. At the same time, for improved maintenance access the engine-to-pylon disconnect point can be kept rearwards of any fixed fairings defining aerolines at the front of the core engine.

In a second aspect, the present disclosure provides an aircraft having one or more gas turbine engines including respective support structures according to the first aspect, the one or more gas turbine engines being attached to respective pylons of the aircraft by the support structures.

In a third aspect, the present disclosure provides a support structure for attaching a gas turbine engine to an aircraft pylon having a front connection face; wherein the engine further includes: an engine core comprising a turbine, a compressor, and a core shaft connecting the turbine to the compressor, and a core casing surrounding the engine core; wherein the support structure includes: an engine-side interface member positioned outwardly of and radially spaced from the core casing, the engine-side interface member extending from a bottom end on one side of the core casing to an opposite bottom end on the opposite side of the core casing, a pylon-side interface member configured to join to the front connection face and interfacing to the engine-side interface member, and a top connection formation configured to be positioned above the engine core and a pair of side connection formations positioned on opposite lateral sides of the engine core, the side connection formations respectively joining to the bottom ends of the engine-side interface member, and extending forwardly from the engine-side interface member to join to respective front fixation points at the core casing; and wherein the engine-side interface member and the pylon-side interface member are joined by plural circumferentially spaced connective links configured so as to transfer roll torques from the engine to the pylon.

Optional features of the invention will now be set out. These are applicable singly or in any combination with any aspect of the invention.

The engine-side interface member may extend circumferentially around a top half of the core casing.

The top connection formation may be a top V-shaped connection formation.

The top V-shaped connection formation may comprise a pair of connection members meeting at a vertex, the vertex of the top V-shaped connection formation connecting to a top of the engine-side interface member.

The pair of side connection formations may be a pair of side V-shaped connection formations.

Each of the side V-shaped connection formations may comprise a pair of connection members meeting at a respective vertex connecting to respective bottom ends of the engine-side interface member.

The three V-shaped connection formations may be configured to transfer roll torques and lateral, vertical, and axial loads from the engine to the engine-side interface member.

The circumferentially spaced connective links of the support structure may include a top connective link positioned above the engine core and two side connective links positioned on opposite lateral sides of the engine core. This arrangement helps to produce an even distribution of the transmitted torques and loads via the engine-side interface member and the pylon-side interface member.

The engine-side interface member and the pylon-side interface member of the support structure may both have circular arc shapes, these shapes being particularly efficient for transmitting roll torques. In this way, the engine-side interface member and the pylon-side interface member can be made compact, which reduces their impact on the engine aerolines and facilitates operational access to the engine.

A longer one of the engine-side interface member and the pylon-side interface member may extend circumferentially no more than 240° around the core casing. By avoiding having either of these members extending around the full circumference of the engine, access to the engine for maintenance and other operational reasons can be improved. It also frees space around the bottom area of the engine for core systems installation such as, for example, an accessory gearbox and units.

The engine may further include a cowl providing an aerodynamic fairing surrounding the core casing, and the engine-side interface member, the pylon-side interface member and the top and side V-shaped connection formations may be positioned inside the cowl. In this way, the interface members and connection formations can be shielded from external airflows.

The front fixation points of the top and side V-shaped connection formations of the support structure may be circumferentially spaced around the core casing. This arrangement helps to distribute loads more evenly around the engine, reducing casing distortions.

The engine may further include a propulsive fan located upstream of the engine core, a bypass duct arranged radially outwardly of the engine core to contain a bypass airflow generated by the fan, and a circumferential row of outlet guide vanes extending across the bypass duct behind the fan; and the front fixation points of the top and side V-shaped connection formations may be located at or adjacent the radially inner ends of the outlet guide vanes. This is advantageous as the outlet guide vanes form a relatively stiff structure and therefore connecting the V-shaped connection formations at or close to them provides additional stability and reduces core casing distortions.

The engine may further include a gearbox that receives an input from the core shaft and outputs drive to the fan so as to drive the fan at a lower rotational speed than the core shaft.

The support structure may further include a pair of thrust links positioned on opposite lateral sides of the engine core, each thrust link having a first end which joins to a respective bottom end of the engine-side interface member, and each thrust link extending rearwardly, upwardly and inwardly from its first end to a second end which joins to a lower connection face of the aircraft pylon to substantially transfer only axial loads from the engine to the pylon. The thrust links thus transfer axial loads via the side V-shaped connection formations from the front of the engine casing. The thrust links, advantageously, are not directly connected to the core casing over the engine core compressors but rather to the engine-side interface member, thereby reducing local casing distortions which have a detrimental impact on tip clearance and engine performance. Optionally, the thrust links may be joined to the lower connection face of the aircraft pylon via a means configured to balance thrust loads in each thrust link, such as for example a balance beam or a whippletree arrangement.

The support structure may further include a rear mount extending from a rear fixation point at the core casing to join to the lower connection face, the front fixation points of the top and side V-shaped connection formations being spaced from the rear fixation point of the rear mount such that yaw and pitch torques are transferred from the engine to the pylon via the front fixation points and the rear mount. Similarly, this reduces the need for the engine-side interface member, the pylon-side interface member and their connective links to transfer yaw and pitch torques, allowing them to be configured to transmit roll torques in an efficient manner.

Focusing the mechanical requirements of the connective links and the interface members on transmission of roll torques enables configurations of these components which occupy less space. In particular, the interface members can be configured to transmit roll torques efficiently and in such a way as to have a relatively low impact on engine aerolines and to facilitate operational access to the engine.

The rear mount may be rearwards of the second ends of the thrust links.

The support structure may further include a failsafe arrangement neighbouring both the engine-side and the pylon-side interface members, the failsafe arrangement being configured such that, in the event of failure of one or more of the components of the support structure, the failsafe arrangement comes into contact with both the engine-side and the pylon-side interface members to transfer torques and loads from the engine to the pylon.

The engine may further include a circumferential heat exchange unit surrounding the engine core. In this case, the V-shaped connection formations can conveniently extend forwardly to fit underneath the heat exchange unit of the engine. Additionally or alternatively, the V-shaped connection formations can extend forwardly to fit underneath other fixed core fairings.

As noted elsewhere herein, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments illustrating the principles of the invention will now be discussed with reference to the accompanying figures in which.

DETAILED DESCRIPTION OF THE DISCLOSURE

Aspects and embodiments of the present invention will now be discussed with reference to the accompanying figures. Further aspects and embodiments will be apparent to those skilled in the art. All documents mentioned in this text are incorporated herein by reference.

Figure 1:
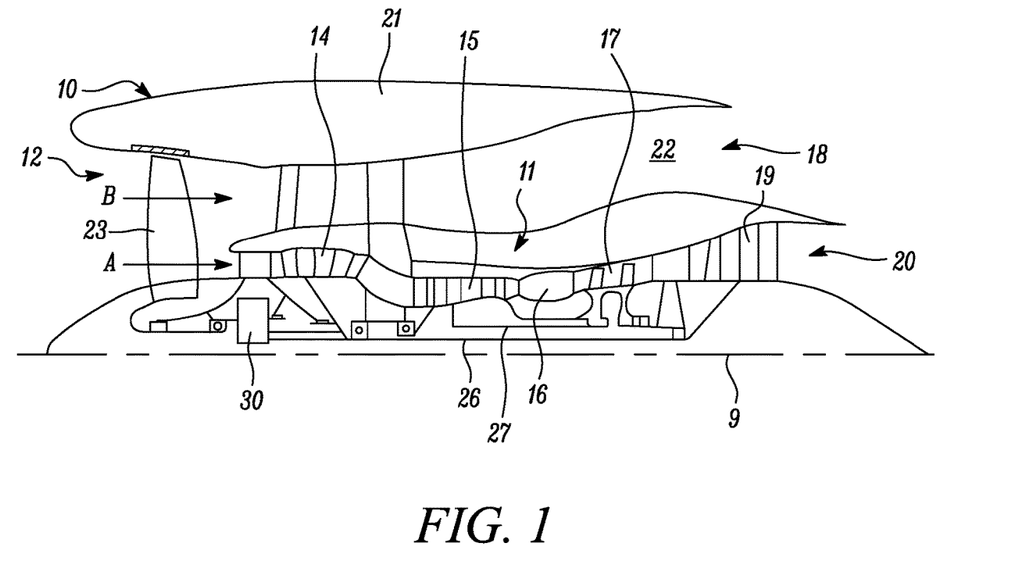
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place.

The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
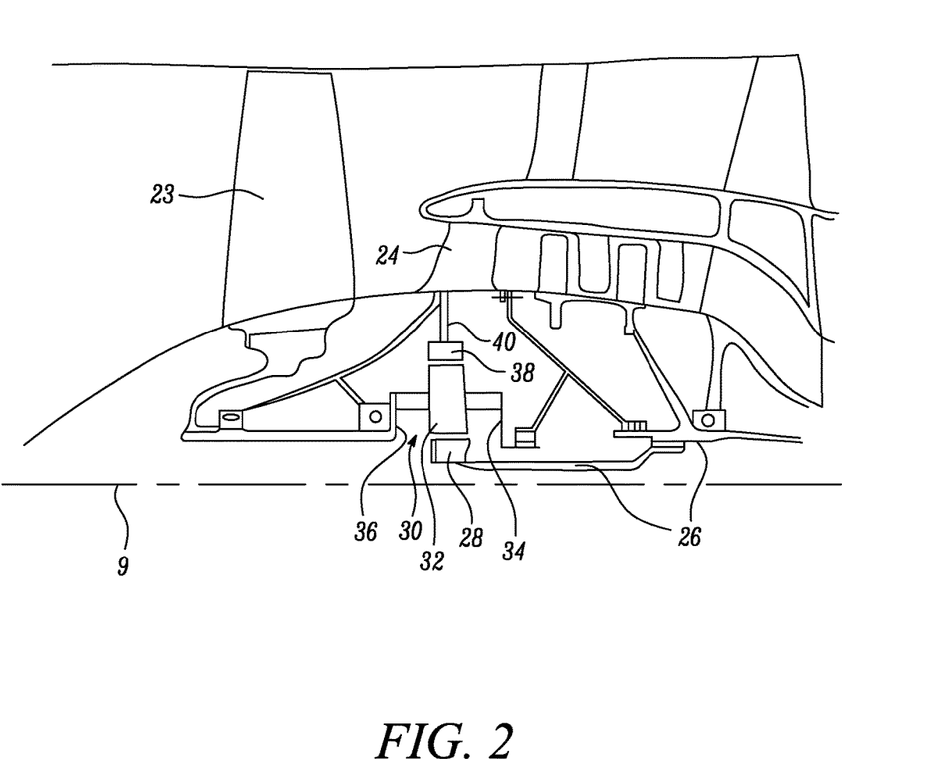
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
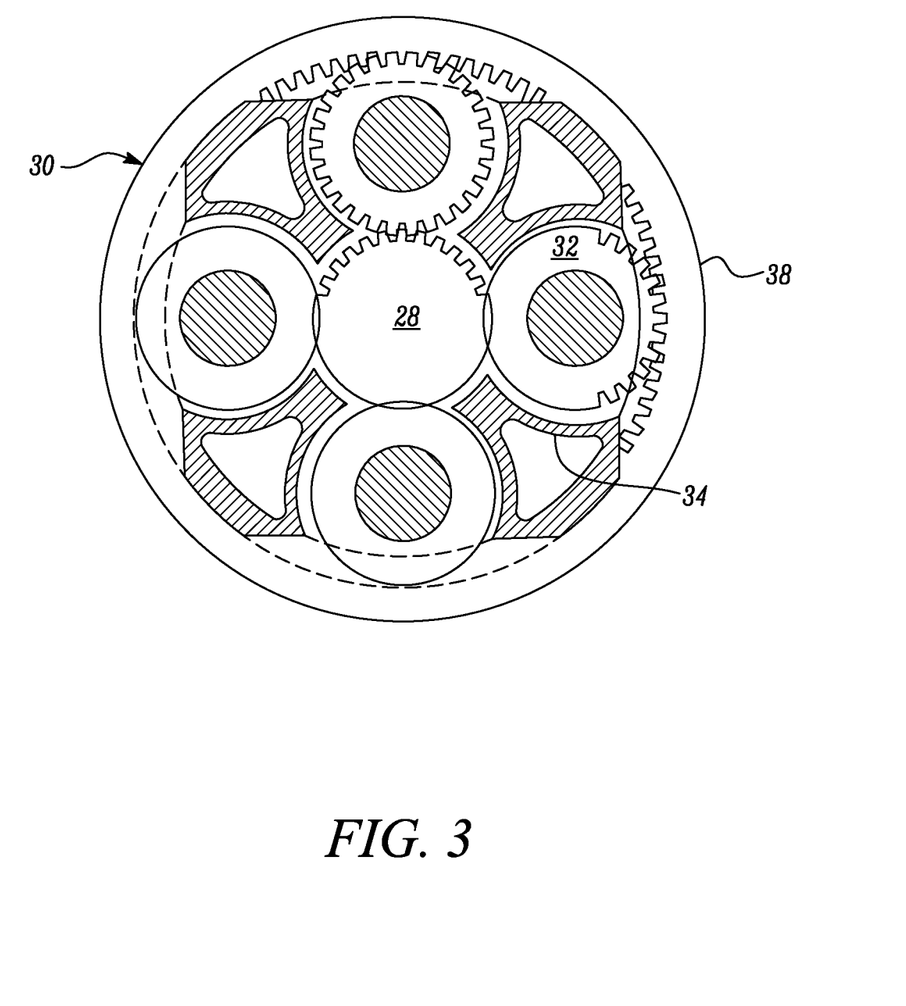
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
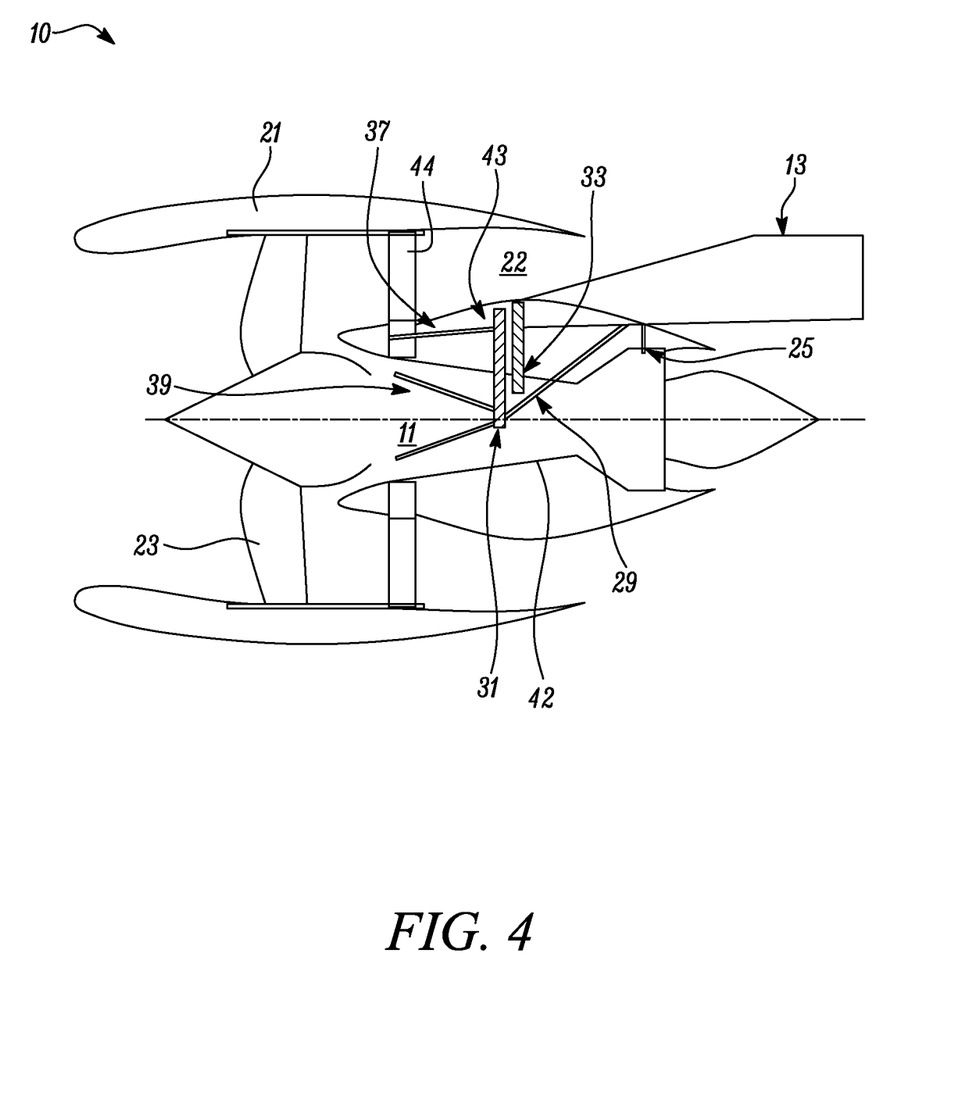
FIG. 4 is a schematic side view of a gas turbine engine including a support structure for attaching the engine to a pylon.
Figure 5:
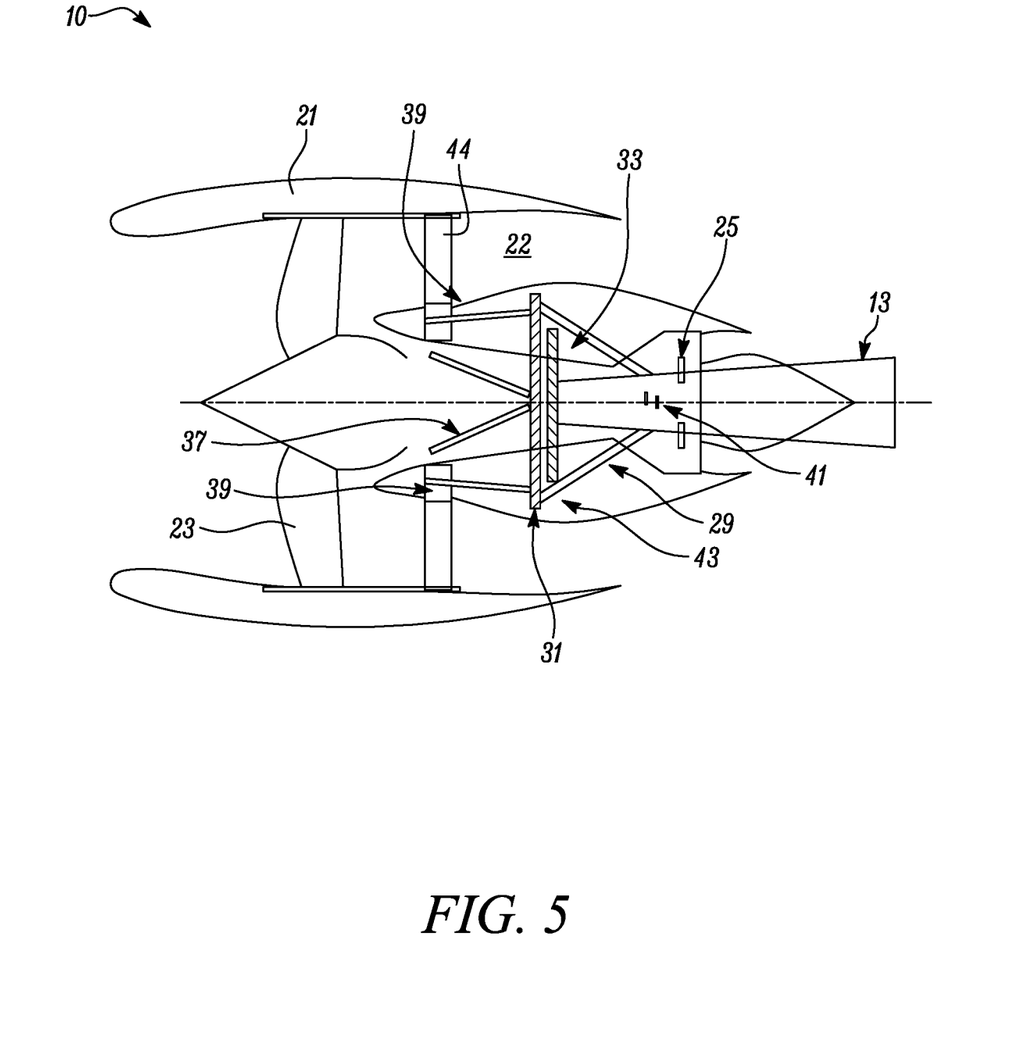
FIG. 5 is a schematic top view of the gas turbine engine of FIG. 4.

FIG. 4 is a schematic side view and FIG. 5 is a schematic top view of a similar gas turbine engine 10. Equivalent features in FIGS. 4 and 5 and FIGS. 1 to 3 have the same reference numbers. Thus, the gas turbine engine 10 shown in FIGS. 4 and 5 has a nacelle 21, a bypass duct 22, a fan 23, FOGVs 44, an engine core 11, and a core casing 42. Also shown, however, is a support structure 43 which attaches the engine 10 to an aircraft pylon 13. The support structure 43 has a top V-shaped connection formation 37 and two side V-shaped connection formations 39, an engine-side interface member 31 joining to a front connection face of the aircraft pylon 13, a pylon-side interface member 33, a pair of thrust links 29, a link 41 for connecting the thrust links 29 and joining them to a lower connection face of the pylon 13, and a rear mount 25 connecting the core casing 42 to the lower connection face of the pylon 13. This structure has to transmit axial, vertical and lateral loads, as well as roll, yaw and pitch torques from the engine to the pylon.

Optionally, the thrust links 29 may be joined to the lower connection face of pylon 13 via a balance beam or a whippletree arrangement. The balance beam or whippletree arrangement may be configured to balance thrust loads in each thrust link 29 and to substantially prevent yaw torques being reacted by the thrust links 29.

The engine-side interface member 31 and the pylon-side interface member 33 of the support structure 43 both have circular arc shapes extending around a top half of the core casing 42. More particularly, each of the engine-side interface member 31 and the pylon-side interface member 33 extend down opposite sides of the engine from a position at top dead centre of the engine 10 to respective bottom ends. The members form respective circular arcs, this shape being particularly efficient for transmitting roll torques. The engine-side interface member is longer than the pylon-side interface member, the arc of the engine-side interface member subtending an angle of up to about 240° C., although other configurations are possible (e.g. the pylon-side interface member being longer than the engine-side interface member).

Each V-shaped connection formation 37, 39 is formed by a pair of connection members meeting at a vertex. The vertex of the top V-shaped connection formation 37 connects to the top of the engine-side interface member 31, and the vertices of the side V-shaped connection formations 39 connect to the respective bottom ends of the engine-side interface member 31.

The connection members extend forwardly from these vertices to connect to the core casing 42 at respective front fixation points at the base of the FOGVs 44. The front fixation points are circumferentially spaced around the core casing to distribute loads evenly around the engine. Conveniently, the connection members can fit underneath fixed core fairings or a circumferential heat exchange unit (not shown) which surround the engine core 11.

Advantageously, the FOGVs 44 form a relatively stiff structure, and therefore connecting the V-shaped connection formations 37, 39 at or close to them enhances stability and reduces core casing distortions. This position of the front fixation points is also relatively remote from parts of the core casing 42 which define critical top clearances. The V-shaped connection formations transfer loads and torques (e.g. from fan blade off seizure torques, or from aerodynamic loading on the FOGVs or power gearbox) rearwards from the front fixation points outside of and tangentially to the core casing 42, relieving the core casing of the need to perform this function, which helps to reduce the weight of this casing. Despite being outwardly of the core casing, the V-shaped connection formations contribute to a reduced radial profile of the support structure 43, with the V-shaped connection formations 37, 39 being installed, along with the engine-side 31 and pylon-side 33 interface members, inside a cowl providing an aerodynamic fairing surrounding the core casing, but without requiring an extended upper bifurcation in the bypass duct 22 or local blister fairings to cover them. This reduces their impact on bypass duct exhaust aerolines and improves the aerodynamic performance of the engine 10. Also the pylon structure can be moved aft, and the FOGV to pylon distance increased. Related to this, the engine-to-pylon disconnect point can be located rearwards of any fixed fairings which define aerolines of the front part of the core engine for easy disconnection of the engine from the aircraft pylon and improved maintenance access.

During operation, the top V-shaped connection formation 37 transmits lateral loads from the core casing 42 to the engine-side interface member 31 and thence into the pylon-side interface member 33. The two side V-shaped connection formations 39 transmit axial loads from the core casing into the thrust links 29. The two side V-shaped connection formations 39 also transmit vertical loads to the engine-side interface member 31 and thence into the pylon-side interface member 33. All three V-shaped connection formations 37, 39 thus react roll torques into the pylon-side interface member 33 via the engine-side interface member 31. The rear mount 25 transmits lateral and vertical loads from the core casing 42 to the lower connection face of the pylon. Thus, through the ability of the front fixation points and the rear mount to react lateral and vertical loads, and the substantial spacing of the front fixation points from the rear mount 25, yaw and pitch torques can be effectively transferred from the engine 10 to the pylon 13 via the front fixation points and the rear mount 25, and not through the engine-side 31 and pylon-side 33 interface members.

Figure 6:
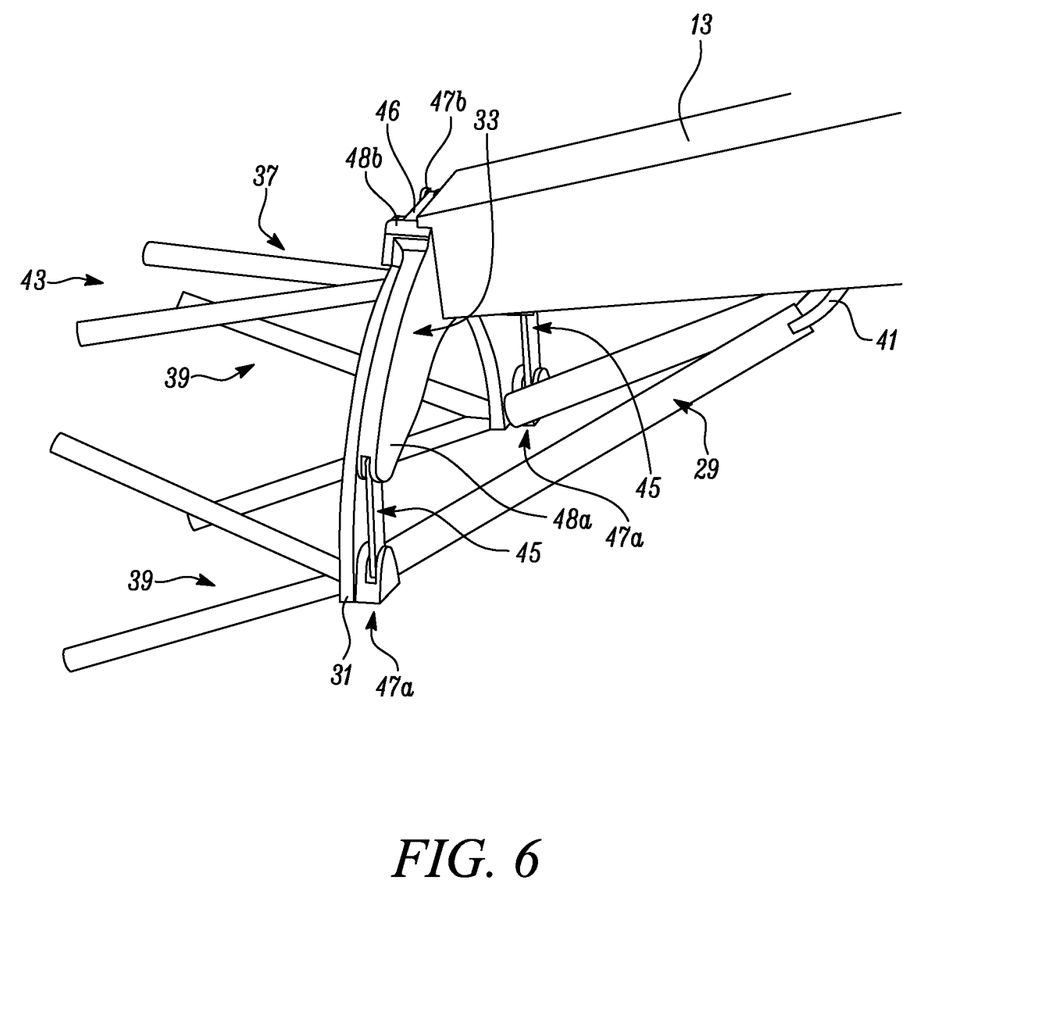
FIG. 6 is a perspective side view of part of the support structure.
Figure 7:
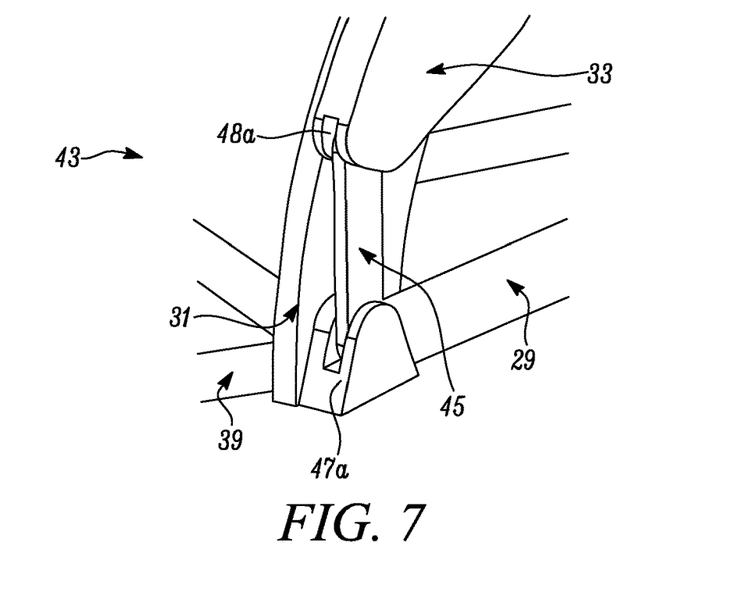
FIG. 7 is a perspective view of a side connective link of the support structure.
Figure 8:
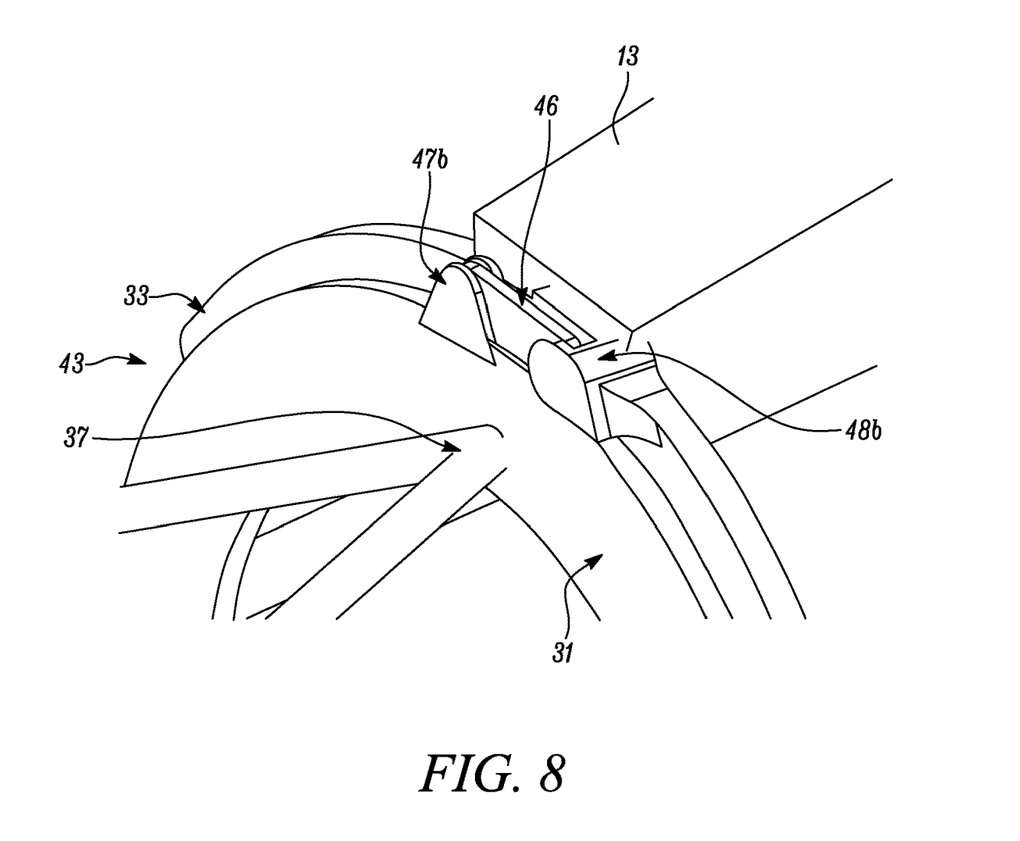
FIG. 8 is a perspective view of a top connective link of the support structure.

FIG. 6 is a perspective side view of part of the support structure 43 shown in FIGS. 4 and 5. In particular it shows the pylon-side interface member 33 joined to the engine-side interface member 31 via three (two side and one top) circumferentially spaced connective links 45, 46. FIG. 7 is a perspective view of one of the two side connective links 45, and FIG. 8 is a perspective view of the top connective link 46. The engine-side interface member 31 and pylon-side interface member 33 transfer primarily just roll torques to the pylon 13. This reduces the mechanical burden on the interface members 31, 33 so that they do not need to occupy as much space as would be the case if they had to transmit substantial amounts of 5p3itch and yaw torques. Additionally, the interface members 31, 33 are mechanically simple and relatively low in weight as they do not require additional bracing features. The interface members 31, 33 thus have a relatively low impact on engine aerolines and facilitate operational access to the engine 10.

The thrust links 29 are positioned on opposite lateral sides of the engine core 11 and are connected to respective bottom ends of the engine-side interface member 31. The thrust links 29 further extend rearwardly, upwardly and inwardly from their respective first ends in contact with the engine-side interface member 31 to their respective second ends which are joined together via a link 41 and connected to the lower connection face of the pylon 13. In this way, the thrust links 29 accept axial loads transmitted to the engine-side interface member by the side V-shaped connection formations 39 and transfer these loads to the lower connection face of the pylon 13.

The top connective link 46 is positioned at top dead centre above the engine core 11 and the two side connective links 45 are respectively positioned on opposite lateral sides of the engine core 11. The top connective link extends in a side-to-side direction and has one end attached at a spherical joint housed in a top clevis 47b provided by the engine-side interface member 31 and the other end attached at a spherical joint housed in a top clevis 48b provided by the pylon-side interface member 33. Each side connective link extends in a vertical direction and has a bottom end attached at a spherical joint housed in a respective clevis 48a provided by the engine-side interface member 31 and a top end attached at a spherical joint housed in a respective clevis 47a provided by the pylon-side interface member 33.

Figure 9:
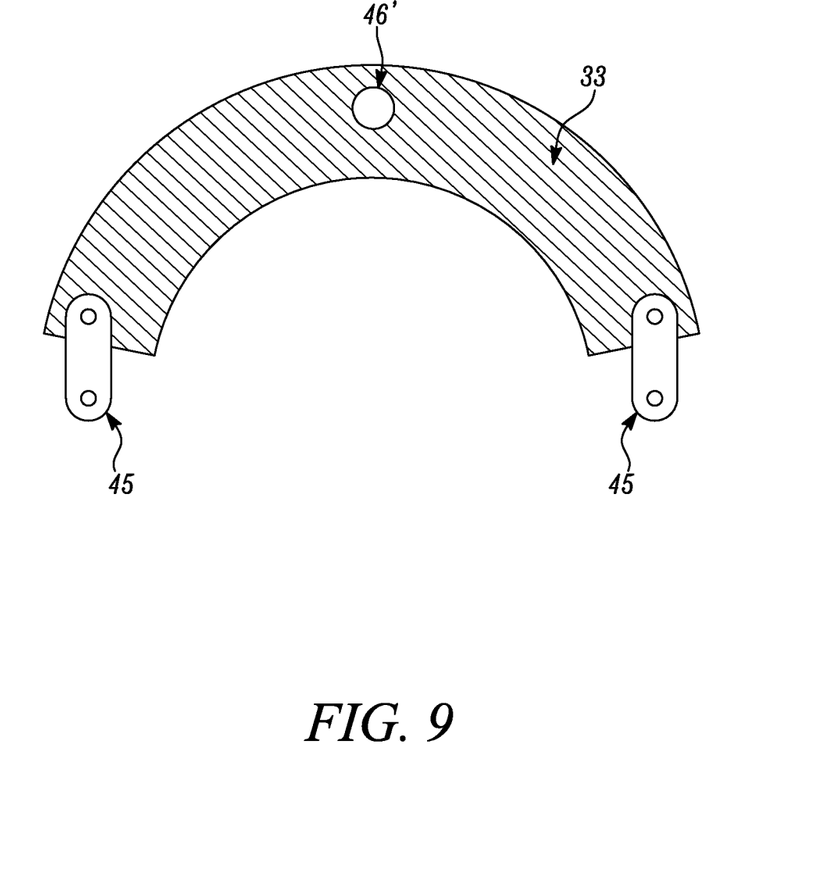
FIG. 9 is a schematic front view of a pylon-side interface member of a variant of the support structure.

The side connective links 45 are configured to transfer primarily roll torques and vertical loads from the engine-side interface member 31 to the pylon-side interface member 33 and thence to the pylon 13. The top connective link 46 is configured to transfer primarily roll torques and lateral loads from the engine-side interface member 31 to the pylon-side interface member 33 and thence to the pylon 13. The top 46 and side 45 connective links are configured to substantially prevent pitch and yaw torques being reacted by the engine-side and pylon-side interface members. To react roll torque one of the side links 45 is loaded in compression and the other is loaded in tension. The top link 46 is loaded in tension or compression depending on the direction of the roll torque. This asymmetry, by which two of the links 45, 46 are loaded in one of tension and compression and one is loaded in the other of tension and compression, can be avoided by changing the top link 46 for a forward protruding trunnion and a monoball or pin link 46', as shown in FIG. 9, which is a schematic front view of the pylon-side interface member 33 of such a variant of the support structure 43.

Figure 10A:
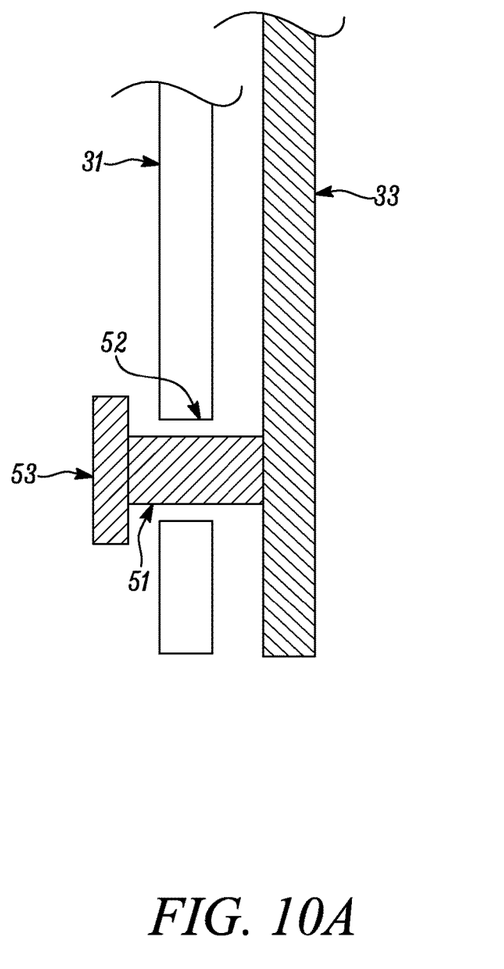
FIGS. 10A and 10B are schematic side views of variants of a part of the support structure including a failsafe arrangement.
Figure 10B:
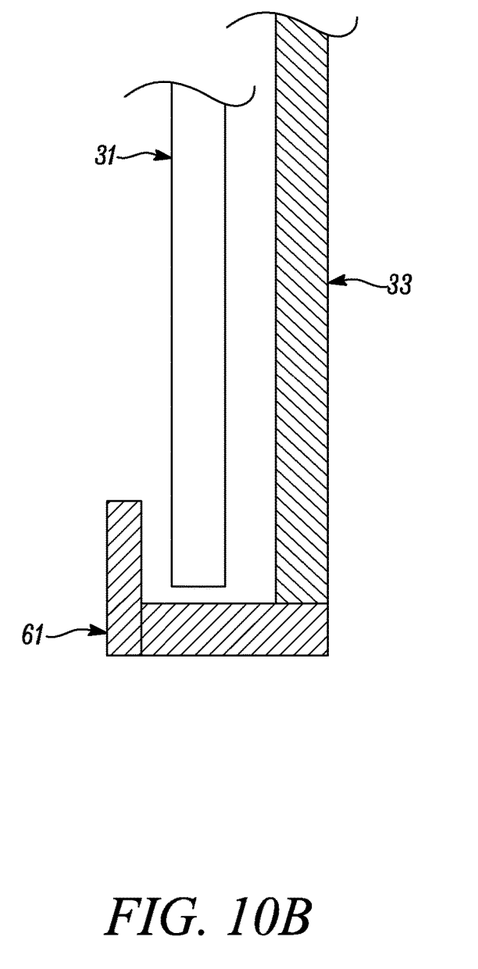

FIGS. 10A and 10B are schematic side views of variants of a part of the support structure 43 including respective failsafe arrangements. FIG. 10A is a schematic side view of a first failsafe arrangement including a trunnion 51 extending forwardly from the pylon-side interface member 33 through a clearance hole 52 formed in the engine-side interface member 31. During normal operation, the trunnion is not in contact with the engine-side interface member 31. However, in the case of failure of one or more of the V-shaped connection formations 37, 39, the trunnion 51 comes into contact with the engine-side interface member 31 to transfer lateral and vertical loads from the engine 10 to the pylon 13. Optionally, the first failsafe arrangement may further include a catcher end plate 53 removably attached to the trunnion 51 and configured to transfer axial loads in the event of, for example, failure of a thrust link 29. Alternatively (not shown here), the trunnion could extend backwardly from the engine-side interface member into a clearance hole formed in the pylon-side interface member instead. FIG. 10B is a schematic side view of a second failsafe arrangement including a catcher hook 61 extending forwards from the pylon-side interface member 33 around the outside bottom end of the engine-side interface member 31. This performs a similar function to the trunnion 51 and end plate 53 of the first failsafe arrangement. Alternatively (not shown here), the catcher hook 61 may extend rearwards from the engine-side interface member 31 around the outside bottom end of the pylon-side interface member 33.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A gas turbine engine including a support structure for attaching the engine to an aircraft pylon having a front connection face;
    wherein the engine further includes:
    an engine core comprising a turbine, a compressor, and a core shaft connecting the turbine to the compressor, and
    a core casing surrounding the engine core;
    wherein the support structure includes:
    an engine-side interface member positioned outwardly of, and radially spaced from, the core casing, the engine-side interface member extending circumferentially around a top half of the core casing from a bottom end of the engine-side interface member on one side of the core casing to an opposite bottom end on the opposite side of the core casing,
    a pylon-side interface member configured to join to the front connection face and interfacing to the engine-side interface member, the pylon-side interface member also extending circumferentially around the top half of the core casing, and
    a top V-shaped connection formation positioned above the engine core and pair of side V-shaped connection formations positioned on opposite lateral sides of the engine core, each V-shaped connection formation being formed by a pair of connection members meeting at a vertex, the vertex of the top V-shaped connection formation joining to the top of the engine-side interface member, the vertices of the side V-shaped connection formations respectively joining to the bottom ends of the engine-side interface member, and the connection members extending forwardly from their respective vertices to join to respective front fixation points at the core casing; and
    wherein the engine-side interface member and the pylon-side interface member are joined by plural circumferentially spaced connective links configured so as to transfer roll torques from the engine to the pylon.

2. The gas turbine engine according to claim 1, wherein the circumferentially spaced connective links include a top connective link positioned above the engine core and two side connective links positioned on opposite lateral sides of the engine core.

3. The gas turbine engine according to claim 1, wherein the engine-side interface member and the pylon-side interface member both have circular arc shapes.

4. The gas turbine engine according to claim 1, wherein a longer one of the engine-side interface member and the pylon-side interface member extends circumferentially no more than 240° around the core casing.

5. The gas turbine engine according to claim 1, wherein the engine further includes a cowl providing an aerodynamic fairing surrounding the core casing, and the engine-side interface member, the pylon-side interface member and the top and side V-shaped connection formations are positioned inside the cowl.

6. The gas turbine engine according to claim 1, wherein the front fixation points of the top and side V-shaped connection formations are circumferentially spaced around the core casing.

7. The gas turbine engine according to claim 1, wherein:
the engine further includes a propulsive fan located upstream of the engine core, a bypass duct arranged radially outwardly of the engine core to contain a bypass airflow generated by the fan, and a circumferential row of outlet guide vanes extending across the bypass duct behind the fan; and
the front fixation points of the top and side V-shaped connection formations are located at or adjacent to the radially inner ends of the outlet guide vanes.

8. The gas turbine engine according to claim 7, wherein the engine further includes a gearbox that receives an input from the core shaft and outputs drive to the fan so as to drive the fan at a lower rotational speed than the core shaft.

9. The gas turbine engine according to claim 1, wherein the support structure further includes a pair of thrust links positioned on opposite lateral sides of the engine core, each thrust link having a first end which joins to a respective bottom end of the engine-side interface member, and each thrust link extending rearwardly, upwardly and inwardly from its first end to a second end which joins to a lower connection face of the aircraft pylon to transfer axial loads from the engine to the pylon.

10. The gas turbine engine according to claim 9, wherein the support structure further includes a rear mount extending from a rear fixation point at the core casing to join to the lower connection face, the front fixation points of the top and side V-shaped connection formations being spaced from the rear fixation point of the rear mount such that yaw and pitch torques are transferred from the engine to the pylon via the front fixation points and the rear mount.

11. The gas turbine engine according to claim 10, wherein the rear mount is rearwards of the second ends of the thrust links.

12. The gas turbine engine according to claim 1, wherein the engine further includes an annular heat exchange unit surrounding the engine core, and the V-shaped connection formations extend forwardly to fit underneath the heat exchange unit.

13. The gas turbine engine according to claim 1, wherein:
the turbine is a first turbine, the compressor is a first compressor, and the core shaft is a first core shaft, and the engine core further includes a second turbine, a second compressor, and a second core shaft connecting the second turbine to the second compressor; and
the second turbine, the second compressor, and the second core shaft are arranged to rotate at a higher rotational speed than the first core shaft.

14. An aircraft having one or more gas turbine engines according to claim 1, the one or more gas turbine engines being attached to respective pylons of the aircraft by the support structures.

15. A support structure for attaching a gas turbine engine to an aircraft pylon having a front connection face,
wherein the engine further includes:
an engine core comprising a turbine, a compressor, and a core shaft connecting the turbine to the compressor, and
a core casing surrounding the engine core;
wherein the support structure includes:
an engine-side interface member positioned outwardly of, and radially spaced from, the core casing, the engine-side interface member extending from a bottom end of the engine-side interface member on one side of the core casing to an opposite bottom end on the opposite side of the core casing,
a pylon-side interface member configured to join to the front connection face and interfacing to the engine-side interface member, and
a top connection formation configured to be positioned above the engine core and a pair of side connection formations positioned on opposite lateral sides of the engine core, the side connection formations respectively joining to the bottom ends of the engine-side interface member and extending forwardly from the engine-side interface member to join to respective front fixation points at the core casing;
wherein the engine-side interface member and the pylon-side interface member are joined by plural circumferentially spaced connective links configured so as to transfer roll torques from the engine to the pylon; and
wherein each of the connective links has a first end attached at a clevis provided by the engine-side interface member and a second end attached at a clevis provided by the pylon-side interface member.

16. The support structure according to claim 15, wherein the engine-side interface member extends circumferentially around a top half of the core casing.

17. The support structure according to claim 15, wherein the top connection formation is a top V-shaped connection formation.

18. The support structure according to claim 17, wherein the top V-shaped connection formation comprises a pair of connection members meeting at a vertex, the vertex of the top V-shaped connection formation connecting to a top of the engine-side interface member.

19. The support structure according to claim 15, wherein the pair of side connection formations is a pair of side V-shaped connection formations.

20. A support structure for attaching a gas turbine engine to an aircraft pylon having a front connection face,
wherein the engine further includes:
an engine core comprising a turbine, a compressor, and a core shaft connecting the turbine to the compressor, and
a core casing surrounding the engine core;
wherein the support structure includes:
an engine-side interface member positioned outwardly of, and radially spaced from, the core casing, the engine-side interface member extending from a bottom end of the engine-side interface member on one side of the core casing to an opposite bottom end on the opposite side of the core casing,
a pylon-side interface member configured to join to the front connection face and interfacing to the engine-side interface member, and
a top connection formation configured to be positioned above the engine core and a pair of side connection formations positioned on opposite lateral sides of the engine core, the side connection formations respectively joining to the bottom ends of the engine-side interface member and extending forwardly from the engine-side interface member to join to respective front fixation points at the core casing;

wherein the engine-side interface member and the pylon-side interface member are joined by plural circumferentially spaced connective links configured so as to transfer roll torques from the engine to the pylon;

wherein the pair of side connection formations is a pair of side V-shaped connection formations; and wherein each of the side V-shaped connection formations comprises a pair of connection members meeting at a respective vertex connecting to respective bottom ends of the bottom ends of the engine-side interface member.

* * * * *